US012781543B2

(12) United States Patent
Stenild et al.

(10) Patent No.: US 12,781,543 B2
(45) Date of Patent: Nov. 3, 2026

(54) SECURITY TAG ASSEMBLY DETACHER

(71) Applicants: ES HOLDING DRAGøR APS, Dragør (DK); BRAEBURN ASSET HOLDINGS, LLC, Delray Beach, FL (US)

(72) Inventors: Eddie L. Stenild, Dragør (DK); Johan Skjellerup, Delray Beach, FL (US)

(73) Assignees: BRAEBURN ASSET HOLDINGS, LLC, Delray Beach, FL (US); ES HOLDING DRAGØR APS (DK)

( * ) Notice: Subject to any disclaimer, the term of this patent is extended or adjusted under 35 U.S.C. 154(b) by 21 days.

(21) Appl. No.: 18/909,022

(22) Filed: Oct. 8, 2024

(65) Prior Publication Data

US 2026/0098429 A1 Apr. 9, 2026

Related U.S. Application Data

(63) Continuation-in-part of application No. 18/906,061, filed on Oct. 3, 2024.

(51) Int. Cl.
*E05B 73/00* (2006.01)

(52) U.S. Cl.
CPC ................................ *E05B 73/0064* (2013.01)

(58) Field of Classification Search
CPC .... A44C 5/04; G08B 13/1445; E05B 73/0064
See application file for complete search history.

(56) References Cited

U.S. PATENT DOCUMENTS

| | | | |
|---|---|---|---|
| D205,049 | S | 6/1966 | Brady |
| 3,947,581 | A | 3/1976 | Swered et al. |
| 3,974,581 | A | 8/1976 | Martens et al. |
| 4,104,622 | A | 8/1978 | Van Niel |
| 4,299,870 | A | 11/1981 | Humble |
| 4,339,853 | A | 7/1982 | Lipschitz |
| 4,510,489 | A | 4/1985 | Anderson, III et al. |
| 4,523,356 | A | 6/1985 | Charlot, Jr. |
| 4,527,310 | A | 7/1985 | Vandebult |
| 4,590,461 | A | 5/1986 | Cooper |
| 4,603,453 | A | 8/1986 | Yokoyama |
| 4,651,136 | A | 3/1987 | Anderson et al. |

(Continued)

FOREIGN PATENT DOCUMENTS

| | | |
|---|---|---|
| BE | 1004849 | 2/1993 |
| DE | 20014860 | 10/2000 |

(Continued)

*Primary Examiner* — Hoi C Lau
(74) *Attorney, Agent, or Firm* — MALLOY & MALLOY, PL

(57) ABSTRACT

A novel detacher assembly for removing security tag assemblies, specifically enhancing the operational efficiencies and security features involved in detaching security tags from merchandise in retail environments. The instant assembly incorporates an innovative combination of mechanical components including a unique geometric aperture pattern formed of various pins and placeholders. Additionally, an integrated switch activates a detacher mechanism, allowing the assembly's components to penetrate and separate a security tag from merchandise. Designed for versatility, the assembly can be integrated into fixed surfaces such as tabletops or checkout counters, or incorporated into handheld devices.

5 Claims, 16 Drawing Sheets

(56) References Cited

U.S. PATENT DOCUMENTS 4,670,950 A 6/1987 Wisecup et al.
4,685,234 A 8/1987 Anderson et al.
4,774,503 A 9/1988 Bussard
4,884,833 A 12/1989 Pedersen
4,944,075 A 7/1990 Hogan
4,993,245 A 2/1991 Ott
5,031,287 A 7/1991 Charlot, Jr. et al.
5,054,172 A 10/1991 Hogan et al.
5,077,872 A 1/1992 Guthammar
5,088,165 A 2/1992 Minasy et al.
5,151,684 A 9/1992 Johnsen
5,192,622 A 3/1993 Cammarano et al.
5,205,024 A 4/1993 Willard
5,208,580 A 5/1993 Crossfield
D343,134 S 1/1994 Witzky et al.
D343,135 S 1/1994 Witzky et al.
D344,033 S 2/1994 Davidge
5,347,262 A 9/1994 Thurmond et al.
5,367,289 A 11/1994 Baro et al.
D354,924 S 1/1995 Garner et al.
5,426,419 A * 6/1995 Nguyen .............. E05B 73/0064 70/57.1
5,497,639 A 3/1996 Charlot, Jr.
5,587,703 A 12/1996 Dumont
5,600,977 A 2/1997 Piron
5,613,384 A 3/1997 Weber et al.
5,748,089 A 5/1998 Sizemore
5,786,762 A 7/1998 Liu
D410,400 S 6/1999 Skjellerup
5,912,622 A 6/1999 Endo et al.
5,942,978 A * 8/1999 Shafer ................. E05B 73/0017 70/57.1
5,942,987 A 8/1999 Heinrich et al.
5,955,951 A 9/1999 Wischerop et al.
6,023,951 A 2/2000 Maurer et al.
6,089,453 A 7/2000 Kayser et al.
6,281,800 B1 8/2001 Sizemore
6,287,800 B1 9/2001 Gallazzo et al.
6,348,865 B1 2/2002 Siegel
D455,363 S 4/2002 Fuss
6,535,130 B2 3/2003 Nguyen et al.
6,722,166 B2 4/2004 Skjellerup
6,724,307 B1 4/2004 Siegel
6,752,837 B2 6/2004 Karp
D494,488 S 8/2004 Sayegh
6,774,794 B2 8/2004 Zimmerman et al.
7,073,236 B2 7/2006 Xue et al.
7,075,440 B2 7/2006 Fabian et al.
7,148,805 B2 12/2006 Hogan
7,183,917 B2 2/2007 Piccoli et al.
7,190,272 B2 3/2007 Yang et al.
7,286,054 B2 10/2007 Skjellerup et al.
7,347,068 B2 3/2008 Seidel
7,382,256 B2 6/2008 Skjellerup et al.
7,400,254 B2 7/2008 Yang et al.
7,474,216 B2 1/2009 Skjellerup et al.
7,474,222 B2 1/2009 Yang et al.
7,523,630 B2 4/2009 Skjellerup
D603,739 S 11/2009 Skjellerup
7,652,574 B2 1/2010 Sayegh
7,724,146 B2 * 5/2010 Nguyen .............. E05B 73/0017 70/57.1
7,750,806 B1 7/2010 Skjellerup et al.
7,817,041 B2 10/2010 Skjellerup et al.
7,986,241 B2 7/2011 Copeland et al.
8,051,686 B2 * 11/2011 Garner ................ E05B 73/0052 70/57.1
8,223,022 B2 7/2012 Skjellerup et al.
8,242,910 B2 8/2012 Skjellerup et al.
8,590,349 B2 11/2013 Skjellerup et al.
9,019,081 B2 * 4/2015 Stewart ............... E05B 73/0064 340/568.1
10,096,217 B2 10/2018 Skjellerup et al.
10,332,372 B2 6/2019 Skjellerup et al.
11,066,851 B2 * 7/2021 Perez ................. G08B 13/2434
2002/0105424 A1 8/2002 Alicot et al.
2003/0067397 A1 4/2003 Trimble
2004/0016269 A1 * 1/2004 Skjellerup ........... E05B 73/0017 70/57.1
2004/0070507 A1 4/2004 Campero
2004/0172989 A1 * 9/2004 Seidel ................. E05B 73/0017 70/57.1
2004/0231375 A1 11/2004 Skjellerup
2004/0233042 A1 11/2004 Piccoli et al.
2004/0237267 A1 * 12/2004 Copen ................. E05B 73/0064 24/704.1
2005/0030182 A1 2/2005 Hogan
2005/0218218 A1 10/2005 Koster
2006/0017574 A1 1/2006 Skjellerup
2006/0125643 A1 6/2006 Skjellerup et al.
2006/0139176 A1 * 6/2006 Skjellerup ........... E05B 73/0064 24/351
2006/0208908 A1 9/2006 Skjellerup et al.
2007/0203587 A1 * 8/2007 Erlandsson ......... A47J 31/3676 700/11
2007/0273523 A1 11/2007 Skjellerup et al.
2009/0139279 A1 * 6/2009 Garner ................ E05B 73/0017 70/57.1
2009/0189768 A1 * 7/2009 Copeland ........... G08B 13/2448 340/572.7
2009/0229327 A1 9/2009 Valade, Jr. et al.
2009/0273475 A1 * 11/2009 Seidel ................... G09F 3/0364 340/572.9
2010/0176951 A1 * 7/2010 Zinner ................ E05B 73/0035 340/572.9
2012/0098664 A1 4/2012 Nordin et al.
2012/0267436 A1 * 10/2012 Yang .................. G08B 13/2434 235/492
2013/0036780 A1 * 2/2013 Valade, Jr. .......... E05B 73/0052 70/276
2013/0118043 A1 * 5/2013 Favier ....................... G09F 7/06 40/518
2013/0199026 A1 8/2013 Mazoki et al.
2013/0247623 A1 * 9/2013 Skjellerup ........... E05B 73/0064 70/57.1
2013/0278425 A1 10/2013 Cunningham et al.
2014/0055249 A1 2/2014 Garner
2014/0203936 A1 7/2014 Rasband et al.
2014/0232530 A1 * 8/2014 Stewart ................. E05B 39/007 340/10.5
2014/0291409 A1 10/2014 Nitta
2015/0029027 A1 1/2015 Villamayor et al.
2015/0048946 A1 2/2015 Luo
2015/0243145 A1 8/2015 Nguyen
2016/0260303 A1 9/2016 Strulovitch et al.
2017/0069185 A1 3/2017 Bergman
2017/0132891 A1 5/2017 Norman et al.
2017/0330435 A1 * 11/2017 Skjellerup ........... E05B 73/0064
2018/0209178 A1 * 7/2018 Wärnbring .......... E05B 73/0064
2018/0218583 A1 8/2018 Skjellerup et al.
2020/0224460 A1 * 7/2020 Miller ................. E05B 73/0017
2021/0087858 A1 * 3/2021 Perez ................. G08B 13/2434
2023/0417083 A1 * 12/2023 Lynch ................. E05B 73/0052
2023/0417084 A1 * 12/2023 Lynch ................ G08B 13/2411
2026/0098428 A1 * 4/2026 Stenild ................ E05B 73/0017
2026/0098429 A1 * 4/2026 Stenild ................ E05B 73/0064

FOREIGN PATENT DOCUMENTS

DE 202004008789 11/2004
DE 202004013895 12/2004
EP 0012923 9/1980
EP 0142748 5/1985
EP 0404329 12/1990
EP 0594324 4/1994
EP 1391574 2/2004
EP 1505551 2/2005
EP 2241705 10/2010
EP 2791872 10/2014
JP 200571143 3/2005
JP 2006249364 9/2006

(56) References Cited

FOREIGN PATENT DOCUMENTS

| | | |
|---|---|---|
| WO | WO03088006 | 10/2003 |
| WO | WO2004106674 | 12/2004 |
| WO | WO2005118991 | 12/2005 |

* cited by examiner

SECURITY TAG ASSEMBLY DETACHER

CROSS REFERENCE TO RELATED APPLICATION(S)

This application is a Continuation-in-Part of U.S. patent having Ser. No. 18/906,061, which was filed on Oct. 3, 2024. The aforementioned application is incorporated by reference herein in its entirety.

BACKGROUND

Field

The present disclosure relates generally to the field of security systems, particularly those used in retail environments for anti-theft purposes. More specifically, the present disclosure pertains to the field of security tag detacher assemblies. The present disclosure relates to detachers designed to efficiently and securely remove security tag assemblies from merchandise. This disclosure further relates to the mechanical components and operational mechanisms that facilitate users to exert minimal effort when removing security tag assemblies, while allowing such assemblies to maintain robust security features. Additionally, the described assembly is versatile, suitable for integration into various operational devices and settings including fixed retail environments and portable, handheld applications.

Description of the Related Art

In the realm of retail security, traditional security tag assemblies and the detacher assemblies used to remove security tags from merchandise often face significant shortcomings that compromise their effectiveness and operational efficiency. The prevailing technologies today are susceptible to well-known methods of tampering and the quick removal of security tags, enabling thieves to abscond with merchandise despite the presence of a tag. Furthermore, tags with enhanced security features often lack accompanying detachers that are simple and intuitive to use, complicating the checkout process for merchandise bearing a security tag.

More specifically, many current security tag designs utilize generic locking mechanisms that can be compromised with commonly available tools or even strong magnets. This deficiency allows individuals with minimal technical know-how to detach these tags without triggering alarms, posing a significant risk to merchandise security. Additionally, other tag designs may have apertures that allow a thief to jam simple objects, such as safety pins, into such apertures to remove the tag.

The size and design of security tags also often limit the incorporation of advanced technology such as non-visible wavelength emitters, which are crucial for modern inventory and security management systems. Indeed, some tags do contain non-visible wavelength emitters, which, when paired with detectors typically located at the entrance or exit of a retail location, trigger an alarm. These emitters, such as RFID or IR signals, are essential for seamless inventory tracking and enhanced security. However, current tags are typically not designed to house such technology without significant increases in size or visibility, which can detract from the customer experience and merchandise display. Moreover, even if current tags maintain a small form factor and incorporate these emitters, the surface area of the emitters is thus reduced, causing the signals they emit to be at a reduced strength. As a result, thieves may be able to bypass detectors and alarms by placing such tags in bags or containers lined with materials that reflect non-visible wavelengths.

In addition, many security tags have one main security feature, such as a lock, non-visible wavelength emitting device, or ink pack. It is rare for security tags to incorporate multiple security or anti-theft technologies. Should a security tag incorporate multiple security technologies, they are still plagued with some of the aforementioned issues, such as size/form factor.

Furthermore, the removal tools, also known as detacher assemblies, for existing security tags are often not user-friendly, requiring significant training or strength to operate effectively. Moreover, checkout assistants are often distracted and rarely pay attention to removing a tag, making it critical for detacher assemblies to be efficient, intuitive, and user-friendly. This is especially true when tags incorporate sophisticated security measures. Ultimately, the shortcomings of current detacher assembly designs lead to operational inefficiencies in retail environments where speed and ease of use are critical during checkout or re-tagging processes. Also, the robustness of detachers is often limited, with many models being prone to malfunction or damage over time, especially under frequent use. This results in increased maintenance costs and operational downtime, which are undesirable for busy retail operations. Additionally, detachers are generally limited to either being in a stationary environment, such as on a tabletop, or being on a handheld device, but not both. This lack of flexibility causes a problem for merchants who might want to uniformly use a specific security tag but need flexibility in the locations where the tags are deployed. Indeed, in some instances, a merchant might want to uniformly use a security tag at its traditional retail stores and in pop-up/mobile stores. In such instances, a tabletop detacher might be preferred in a traditional retail store environment, but a handheld device may be better suited for a pop-up/mobile location.

The deficiencies outlined highlight a significant need for a security tag assembly and detacher system that addresses current vulnerabilities in retail security. A solution is required that incorporates robust and innovative security features such as sophisticated locking mechanisms resistant to common tampering methods, enhanced non-visible wavelength emitters for improved detectability that maintain a small form factor, and user-friendly, intuitive detachers that support both stationary and mobile use. This new system should streamline the checkout process while maintaining high security standards, effectively deterring theft and minimizing operational inefficiencies.

SUMMARY

The present disclosure provides for an innovative detacher assembly for a security tag assembly. The detacher assembly allows for the detachment of a security tag assembly that incorporates an advanced locking mechanism that is resistant to common tampering methods. As a result, the detacher maintains a high level of security standard, while additionally incorporating features that allow for the streamlining of a checkout process in a retail environment, minimizing operational inefficiencies traditionally associated with detacher assemblies. Further, the detacher assembly described herein is adaptable for stationary and mobile use.

As such, the present disclosure provides for a detacher assembly for a security tag assembly comprising detacher tooling, comprising at least one removal pin, at least one placeholder pin, and at least one placeholder, wherein the detacher tooling forms a detacher assembly geometric aperture pattern, and a switch, configured to activate a detacher mechanism when depressed by a security tag assembly. The at least one placeholder pin and at least one placeholder are mounted on a spring-loaded surface. The at least one removal pin is configured and dimensioned to pass through the at least one removal pin dispensing aperture, where the at least one placeholder pin passes through the at least one placeholder pin dispensing aperture, and where the at least one placeholder passes through the at least one placeholder aperture. The at least one removal pin dispensing aperture, the at least one placeholder pin dispensing aperture, and the at least one placeholder aperture form the detacher assembly geometric aperture pattern. The detacher mechanism is configured and dimensioned to raise at least one removal pin from an orientation below the removal pin dispensing aperture to an orientation above the removal pin dispensing aperture and into a security tag assembly, causing halves of the security tag assembly to break away and go from a connected state to a disconnected state. The detacher mechanism comprises a plate operatively connected to the at least one removal pin and a motorized element, wherein the motorized element is operatively connected to the plate and configured and dimensioned to move the plate in a vertical direction.

Further, the present disclosure also provides for a detacher assembly for a security tag assembly comprising a faceplate comprising an exterior surface and a nestled surface, the nestled surface at a vertical height below the exterior surface, the exterior surface comprising an aperture that passes from a space beyond the exterior surface to at least the nestled surface, the exterior surface further comprising at least one guide track configured and dimensioned to position a security tag assembly and allow the security tag assembly to slide along a length of the nestled surface, and a switch, configured to activate a detacher mechanism. The assembly further comprises a detacher tooling plate, the detacher tooling plate in parallel relation to the nestled surface. The detacher tooling plate comprises a concave surface geometry, at least one placeholder aperture, at least one removal pin dispensing aperture, at least one placeholder pin dispensing aperture, and at least one switch cutout.

The at least one placeholder aperture, the at least one removal pin dispensing aperture, and the at least one placeholder dispensing aperture, form a detacher assembly geometric aperture pattern, dimensioned to match a portion of a geometric aperture pattern of a security tag assembly. The at least one guide track is further configured and dimensioned to allow the security tag assembly to slide along a length of the tooling plate, position a security tag assembly above the detacher tooling plate at a specified orientation, and cause the security tag assembly to depress the switch when the security tag assembly is positioned above the detacher tooling plate at a specified orientation. Notably, the switch may be below the exterior surface and above the nestled surface and the detacher tooling plate. Detacher tooling may be present, comprising at least one removal pin, at least one placeholder pin, and at least one placeholder. The detacher tooling may also form the detacher assembly geometric aperture pattern. The at least one removal pin can pass through the at least one removal pin dispensing aperture, wherein the at least one placeholder pin passes through the at least one placeholder pin dispensing aperture, and the at least one placeholder passes through the at least one placeholder aperture. The at least one placeholder pin and at least one placeholder are partially depressed, but in contact with a security tag assembly when a security tag is positioned above the detacher tooling plate at a specified orientation, and wherein the at least one placeholder pin and at least one placeholder are configured and dimensioned to retain a security tag at a specific orientation to the detacher tooling plate when a security tag is positioned above the detacher tooling plate at a specified orientation.

The switch, when depressed, activates the detacher mechanism, configured and dimensioned to raise at the at least one removal pin from an orientation below the tooling plate to an orientation above the tooling plate and into a security tag assembly, causing halves of the security tag assembly to break away and go from a connected state to a disconnected state. The detacher mechanism comprises a plate operatively connected to the at least one removal pin and a motorized element, wherein the motorized element is operatively connected to the plate and configured and dimensioned to move the plate in a vertical direction. The assembly also may comprise mounts configured and dimensioned to allow the detacher assembly to mount to a surface. Alternatively, the assembly may comprise mounts configured and dimensioned to allow the detacher assembly to mount to a handheld shell.

These and other objects, features and advantages of the present disclosure will become clearer when the drawings as well as the detailed description are taken into consideration.

BRIEF DESCRIPTION OF THE DRAWINGS

For a fuller understanding of the nature of the present disclosure, reference should be had to the following detailed description taken in connection with the accompanying drawings in which.

Like reference numerals refer to like parts throughout the several views of the drawings.

DETAILED DESCRIPTION

Figure 1:
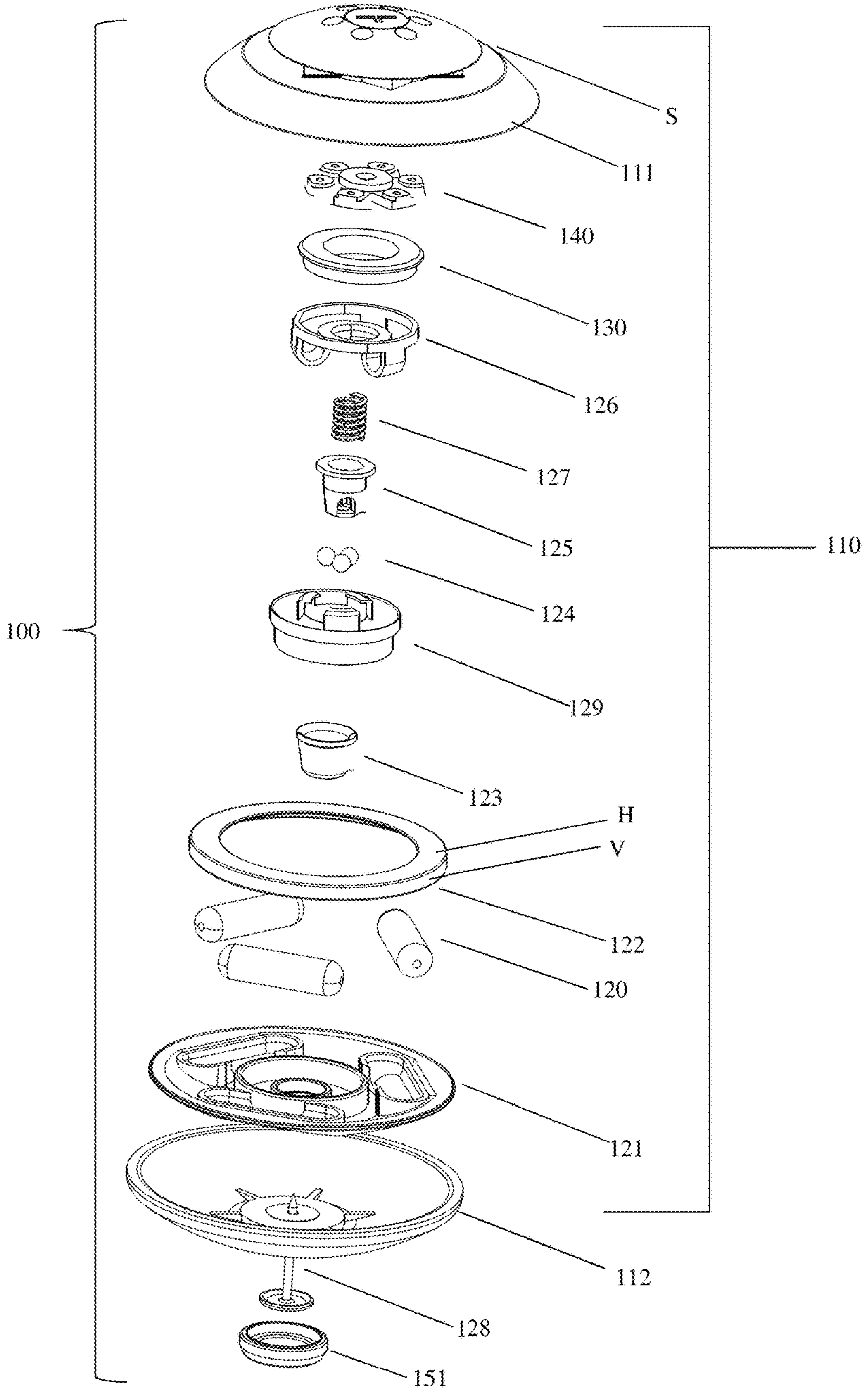
FIG. 1 is a perspective, exploded view of a security tag assembly.

With refence now to FIG. 1, FIG. 1 depicts a perspective, exploded view of a security tag assembly 100. As can be seen and as may be apparent, a housing 110, comprising a first half 111 and a second half 112, houses internals (as will be described) via forming a compartment for such internals within the housing 100. As depicted, such internals may be arranged/stacked as shown in FIG. 1, and are not limited to: at least one ink tube 120, at least one ink tube retention member 121, at least one non-visible wavelength emitter 122 (the at least one non-visible wavelength emitter 122 having a vertical dimensioning V and a horizontal/flat dimensioning H), a bearing cup 123, at least one bearing 124, at least one bearing cylinder 125, at least one retention spring 126, at least one metal spring 127, at least one pressure plate ring 130, and at least one retaining insert 140 comprising at least two apertures 1111 (with dimensions that may be smaller than the apertures formed on the first half 111), said at least two apertures forming a second geometric aperture pattern 1141 identical to a first geometric aperture pattern 1111 (as will be described). As may be apparent, a pin 128, pierces through the second half 112 of the housing 110 (at a pin receiving aperture 150) and through the internals, then being retained in the first half 111 of the housing 112 (as will be described in further detail. Further, the pin 128 may be covered by a plug 151, which is retained by a plug receiver 152 formed by the second half 112. Notably, the pin 128, when piercing the internals may rotate. As such, when covered by a plug 151, the pin 128 may not be rotated by having an external force applied thereto (such as by an individual attempting to tamper with the instant assembly 100), as the plug 151 would cover the pin 128.

Regarding the first half 111 of the housing 110, the first half 111 may have a slot S, configured and dimensioned to be received by an aperture of a detacher assembly (as will be described), to allow the security tag assembly 100 to be oriented about a detacher assembly in a specific fashion (as will also be described). Further, with brief reference to FIG. 3, the first half 111 can be seen, and can be described as having at least two apertures thereon, forming a first geometric aperture pattern 1111. Within FIG. 3, the first geometric aperture pattern 1111 is formed of six apertures in a hexagonal geometric pattern fashion. However, any geometric pattern may be formed by at least two apertures for use on the instant assembly. As such, while this document will mention "geometric aperture pattern" or "geometric pattern" throughout, referring to a hexagonal geometric pattern as is depicted in the Figures, a hexagonal geometric pattern should not be considered as required. Rather, as mentioned, any geometric pattern may be formed by at least two apertures for use on the instant assembly 100 and detacher (as will be described).

Figure 2:
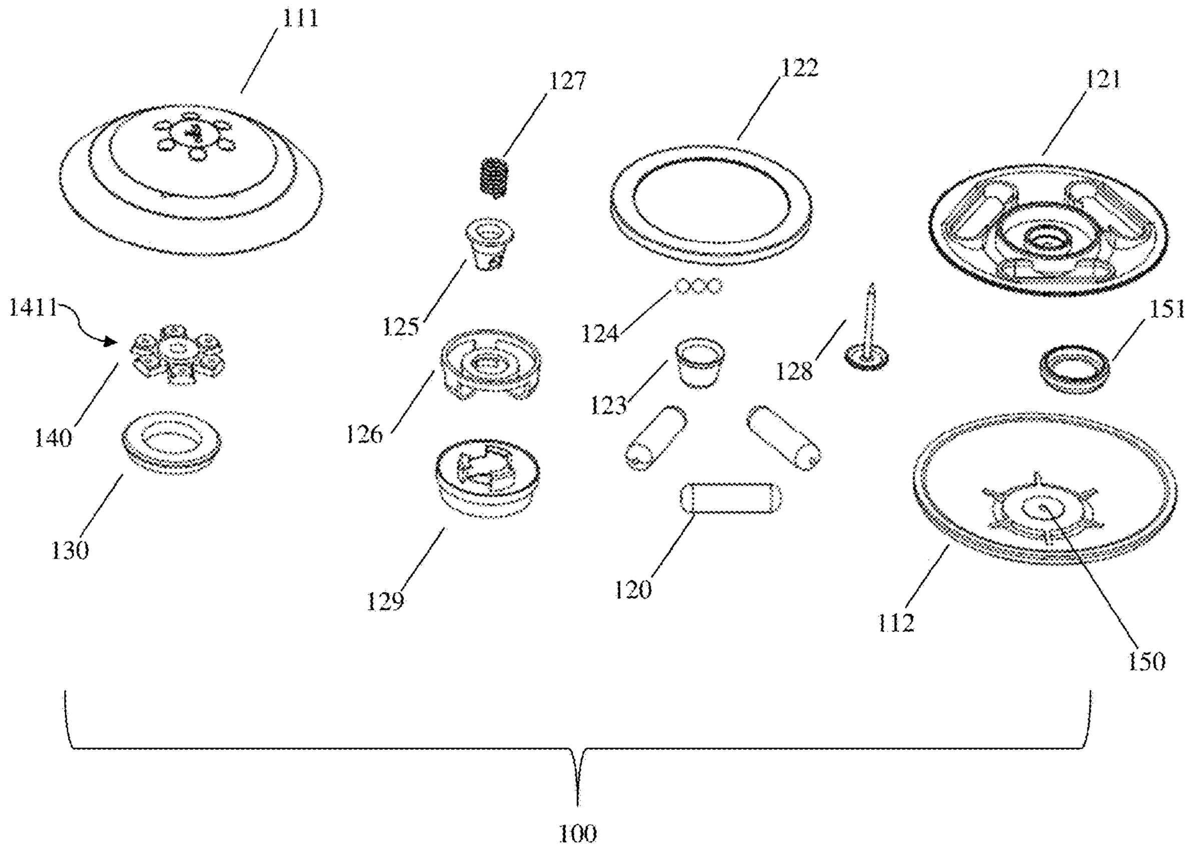
FIG. 2 is a perspective view of the elements that make up a security tag assembly.
Figure 3:
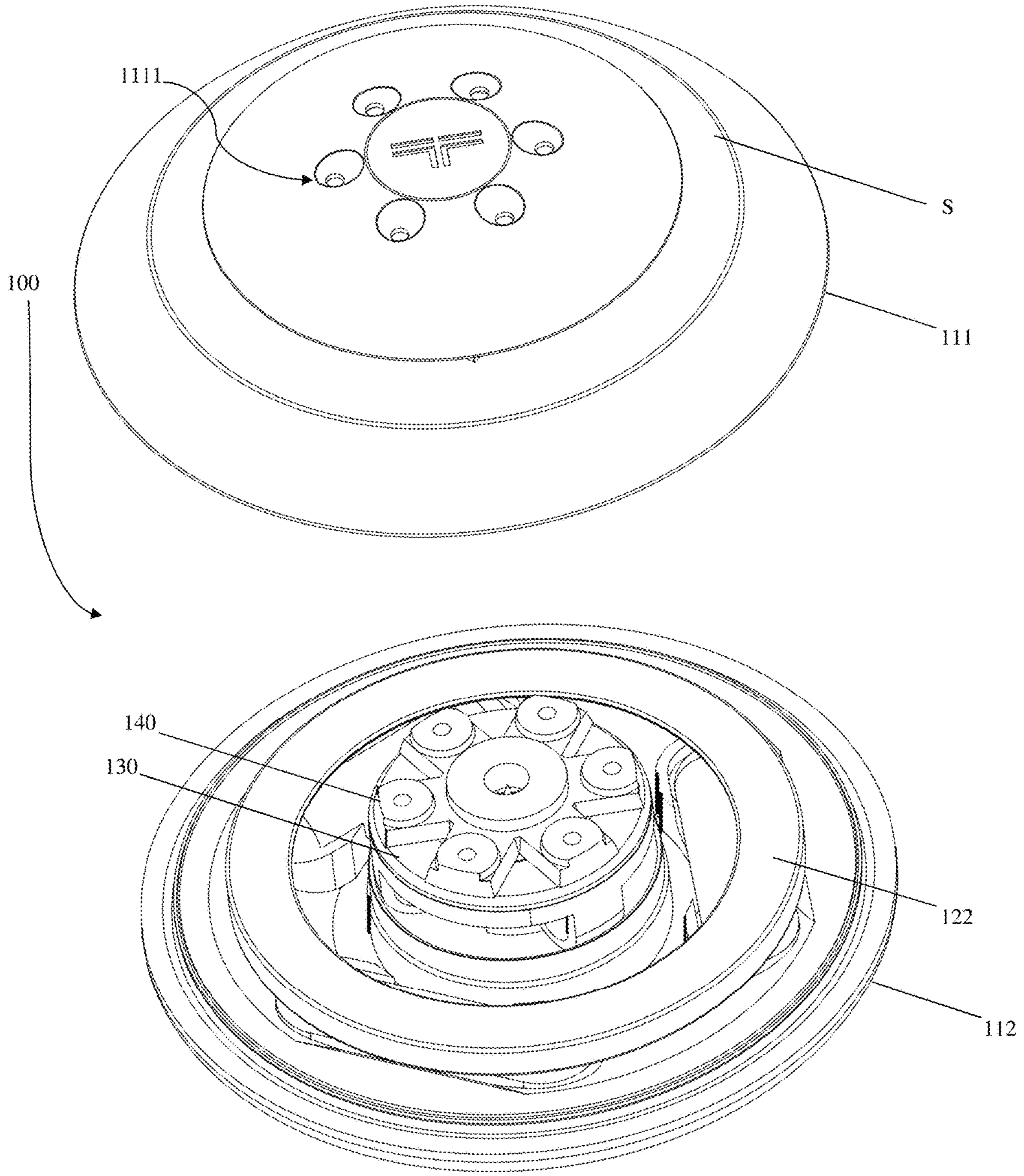
FIG. 3 is a perspective view of a security tag assembly's housing, with internals depicted within the second half of the housing, the housing being in a disconnected state.
Figure 4:
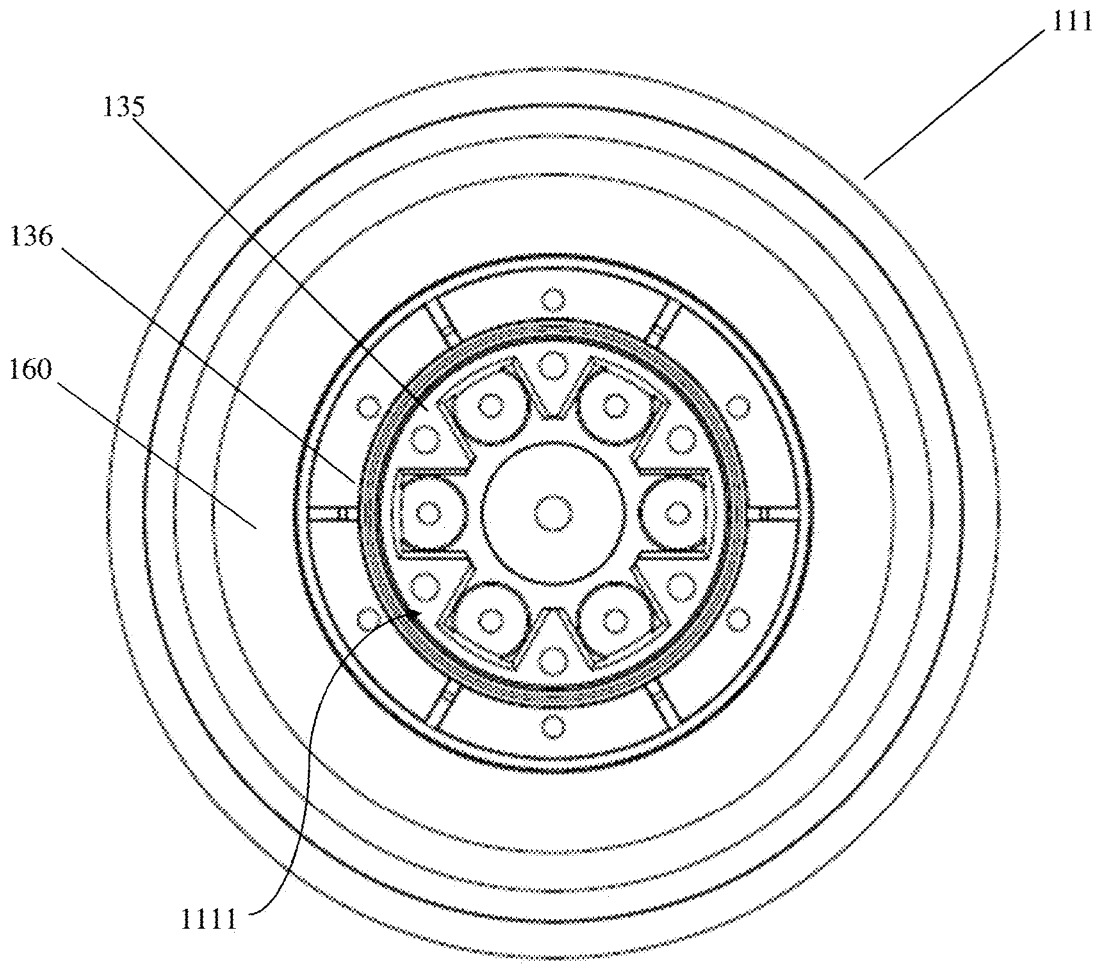
FIG. 4 is an underside view of the interior of a security tag assembly's first half of a housing.

With reference to FIG. 4, a first half 111 can be seen from an underside view that FIGS. 1-3 do not depict. As such, it should be apparent that the apertures that form the geometric aperture pattern 1111 pass through the first half 111. On the underside of the first half 111, a cut out for a retaining insert 140 can also be seen. This cut out allows a retaining insert 140 (which can comprise at least two apertures) to be placed within it. As may be noted from FIGS. 1-3, the retaining insert 140 may have a specific shape, which can conform to the cut out of the first half 111. Also, the retaining insert 140 may have at least two apertures that allow it to form a second geometric aperture pattern 1411. As a result, when a retaining insert 140 is positioned within the cut out, it may fit perfectly within the cut out. In light of this fit, the geometric aperture patterns 1111 and 1411, align. Notably, the apertures 1111 and 1411 pass from an exterior of the housing 110 to a pressure plate ring 130 (as will be described). Further, the retaining insert 140 may be made of a fire-resistant material, but need not be.

With continued reference to FIG. 4, the first half 111 may also comprise a retention cavity 135 or structures that form the retention cavity 135 when the first half 111 and second half 112 are in a connected state. Some of these structures may be a pressure plate retention structure 136 as depicted in FIG. 4 and as will be described in more detail. Further, a non-visible wavelength emitter cavity 160 (which will be described in more detail) may be formed by the first half 111, particularly when the first half 111 and second half 112 are in a connected state.

Figure 6:
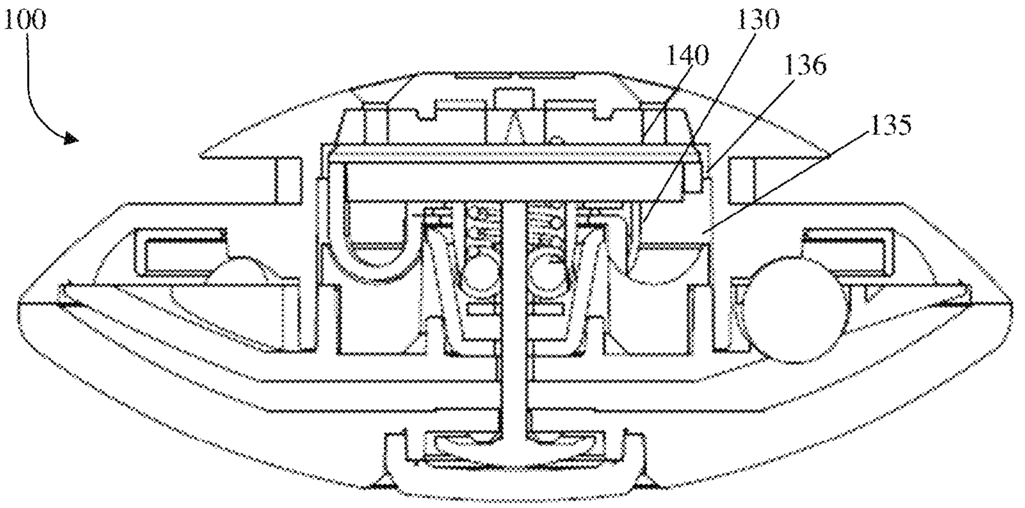
FIG. 6 is a side cut away view of a security tag assembly when a pressure plate is in a pressure applying state.
Figure 7:
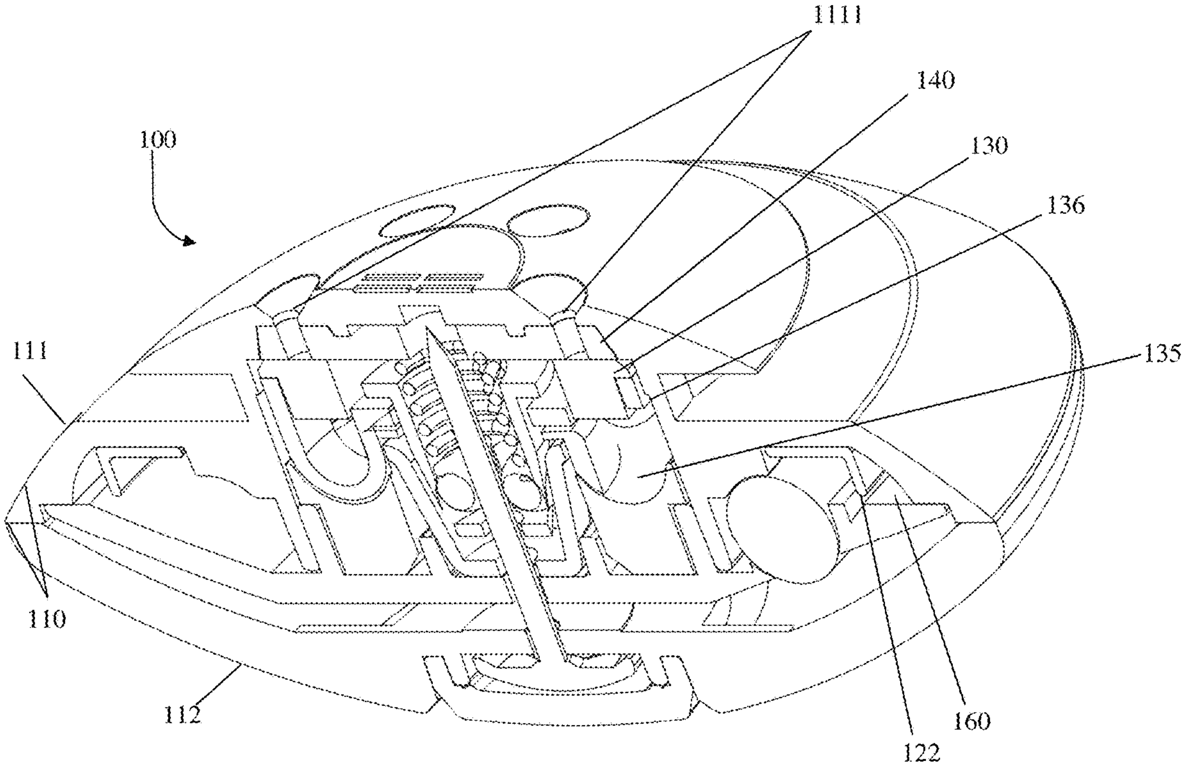
FIG. 7 is a perspective cut away view of a security tag assembly when a pressure plate is in a non-pressure applying state.

As such, with reference to FIGS. 1, 3, and 7, it can be seen that the first half 111 and the second half 112 stack or connect to form a housing 110. As such, FIG. 7 depicts the housing 110 in a connected state, wherein FIG. 3 depicts the housing 110 in a disconnected state. In other words, the housing 110 is in a connected state when the first half 111 and the second half 112 are conjoined. A disconnected state is where a first half 111 and a second half 112 are not conjoined. Notably, and with reference to FIG. 7, a connected state allows the housing 110 to house the internals. With reference to FIGS. 1 and 3, it can be seen that internals can be stacked atop one another to rest largely within the second half 112 (but not all internals may be encapsulated by the second half 112, where reference may be made to FIGS. 5 and 6 to determine orientations of internals within the second half 112). Further, as may be apparent to those skilled in the art, the pin 128, combined with internals such as a bearing cup 123, at least one bearing 124, at least one bearing cylinder 125, at least one retention spring 126, and at least one metal spring 127, allow the pin 128 to retain a first half 111 and a second half 112 in a connected state (when the pin 128 is in a locked state). Further, as may be apparent to those skilled in the art, when spring structures (such as the retention spring 126 and metal spring 127) are decompressed or placed in a less stressed or un-stressed state (by external force application or a detacher), the forces applied to the pin 128 by the aforementioned internals are relieved, allowing the pin 128 to drop, causing the housing 110 to go from a connected state to a disconnected state. When the pin 128 drops, as described above, this may be known as an unlocked state.

With reference to some of the other internals that were not mentioned immediately above, the non-visible wavelength emitter 122 can be seen. While it is known to some in the art to use non-visible wavelength emitters, non-visible wavelength emitters are seldom used in conjunction with infrared wave emission. As such, while the instant non-visible wavelength emitter 122 can emit RFID waves and/or infrared waves, the emitter 122 also comprises a flat and vertical geometry. This geometry allows for there to be a distinguishable difference from, by way of analogy, a floor and wall (i.e. a floor being a horizontal/flat geometry and a wall being a vertical geometry). Specifically, this horizontal/flat H and vertical geometry V can allow for the emitter 122 to have a greater surface area to be able to emit waves, making such emissions stronger and more detectable. Indeed, it has been discovered in the pursuit of the instant disclosure that, the greater the surface area of the non-visible wavelength emitted 122, the stronger or more detectable the waves it emits are. This novel geometry requires an accommodating space within/on an assembly 100, which no assembly has ever included before. As such, the emitter 122 can rest in a cavity 160 (where reference may be had to FIGS. 5-7). As can be noted, this cavity 160 retains the emitter 122 in place and has a volume made up of vertical and horizontal dimensioning. The emitter 122 can also rest atop at least one ink tube 120 and at least one ink tube retention member 121, which allows for the placement of the emitter 122 to be positioned within a cavity 160 when the housing is in the connected state.

FIG. 2 is a perspective view of elements that can make up a security tag assembly 100, and can be referenced for depictions of what elements may make up a security tag assembly 100.

With reference now to FIGS. 1, 3, and 5-7, it can be seen that the retaining insert 140 can be placed atop the pressure plate ring 130, wherein the retaining insert 140 and pressure plate ring 130 are placed atop other internals and pierced by a pin 128. In addition, the first half 111 encapsulates at least the retaining insert 140 and pressure plate ring 130. As previously mentioned, and as may be apparent with reference to FIG. 7, the first geometric aperture pattern 1111 matches that of the retaining insert second geometric aperture pattern 1411. Further, as previously descried, when the pin 128, combined with internals such as a bearing cup 123, at least one bearing 124, at least one bearing cylinder 125, at least one retention spring 126, and at least one metal spring 127, allow the pin 128 to retain a first half 111 and a second half 112 in a connected state (when the pin 128 is in a locked state). This feature and ability of the pin 128 to remain in a locked state wherein the housing 110 is retained in a connected state is premised on stress being placed on, for example, the springs 126/127, which, in turn, causes the other internals to retain the pin 128 in the locked state. As such, it follows that the greater the stress being placed on the springs 126/127, the more the pin 128 will resist transitioning from a locked state to an unlocked state.

As such, as the retaining insert 140 and pressure plate ring 130 have forces pressed upon them to cause the springs 126/127 to compress/stress, the more the pin 128 will resist transitioning from a locked state to an unlocked state. The opposite is also true, as the retaining insert 140 and pressure plate ring 130 have negative forces applied, causing the springs 126/127 to decompress/de-stress, the pin can transition from a locked state to an unlocked state.

Figure 5:
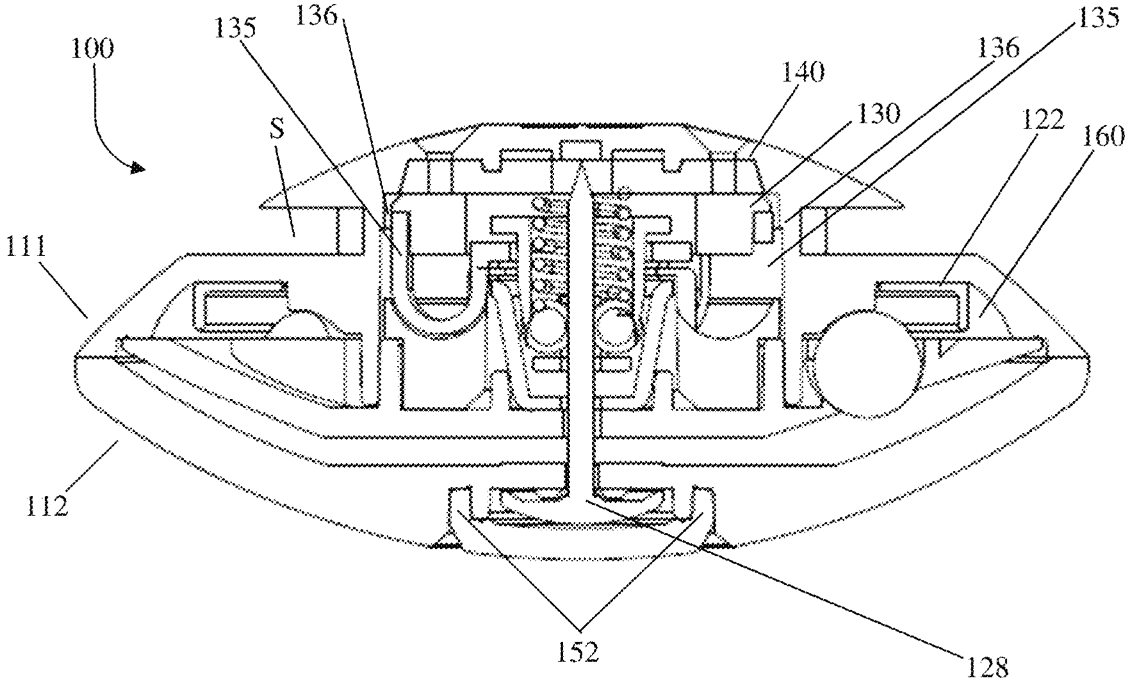
FIG. 5 is a side cut away view of a security tag assembly when a pressure plate is in a non-pressure applying state.

Now that the foregoing has been mentioned, with reference to FIGS. 5 and 6, FIG. 5 represents a cut away view of the instant assembly 100 wherein the pressure plate ring 130, is in a non-pressure applying state, meaning that no or minimal forces are applied to the springs 126/127, in the manner as described above. FIG. 6, on the other hand, represents a cut away view of the instant assembly 100 wherein the pressure plate ring 130 is in a pressure applying state, meaning that forces are applied to the springs 126/127 in the manner as described above, causing, the pin 128 to be more resistant from transitioning from a locked state to an unlocked state. Notably, the pressure plate ring 130 transitions from a non-pressure applying state to a pressure applying state by virtue of an individual (for example, a thief), attempting to cause the housing 110 to go from a connected state to a disconnected state by jamming an object (for example, a safety pin), in the geometric aperture patterns 1111/1411. Indeed, current technology of security tag assemblies may release when a thief inserts an object into apertures, which is a commonly known method of allowing security tag assemblies to release. However, the instant assembly 100 is designed such that, should an individual jam/insert an object into one or multiple of the apertures that form the geometric aperture patterns 1111/1411, the instant assembly's 100 ability to resist transitioning from a connected to disconnected state is bolstered.

With reference now to FIGS. 5-7, the retaining insert 140 can be seen resting atop a pressure plate ring 130, where it can be seen that a pressure plate cavity 135 is formed below the pressure plate ring 130, the pressure plate cavity 135 having retention structures 136 (which may also be described as pressure plate retention structures 136). Further, it can be seen that the pressure plate ring 130 may have tabs or grooves at the outer edge/periphery of its circumferences. As such, these tabs or grooves allow for the pressure plate ring 130 to be retained by the retention structures 136, formed within the pressure plate cavity 135, when the ring 130 is in a pressure applying state. As such, by way of example, as an individual may jam or insert an object into the geometric aperture pattern 1111/1411, the retaining insert and pressure plate ring 130 depress (reference FIG. 5 and compare to FIG. 6). Such a depression can cause the application of greater forces unto the springs 126/127, and can cause the ring 130 to fall further into the cavity 135. In turn, the retention structures 136, hold the ring 130 in this pressure applying orientation, such that should an individual remove the object jammed/inserted into the aperture pattern(s) 1111/1411, the ring 130 maintains its position in a pressure applying state.

To allow the ring 130 to transition back to a non-pressure applying state (from a pressure applying state), detooling (i.e. detacher tooling) can be applied to the first half 111 and the aperture pattern(s) 1111/1411, penetrating/passing through the pattern(s) 1111/1411 and pulling internals (which can include the retaining insert 140 and ring 130) to allow the springs 126/127 to de-stress. As such, when detooling is applied to the first half 111 and the aperture pattern(s) 1111/1411, the housing 110 can transition from a connected state to a disconnected state, where the pin 128 transitions from a locked state to an unlocked state. Regardless as to if the ring 130 is in a pressure applying state or a non-pressure applying state, the detooling applied can allow the housing 110 can transition from a connected state to a disconnected state. Detooling will be described in further detail below, as such detooling can be specifically designed to match the geometric aperture patterns 1111/1411.

Figure 8:
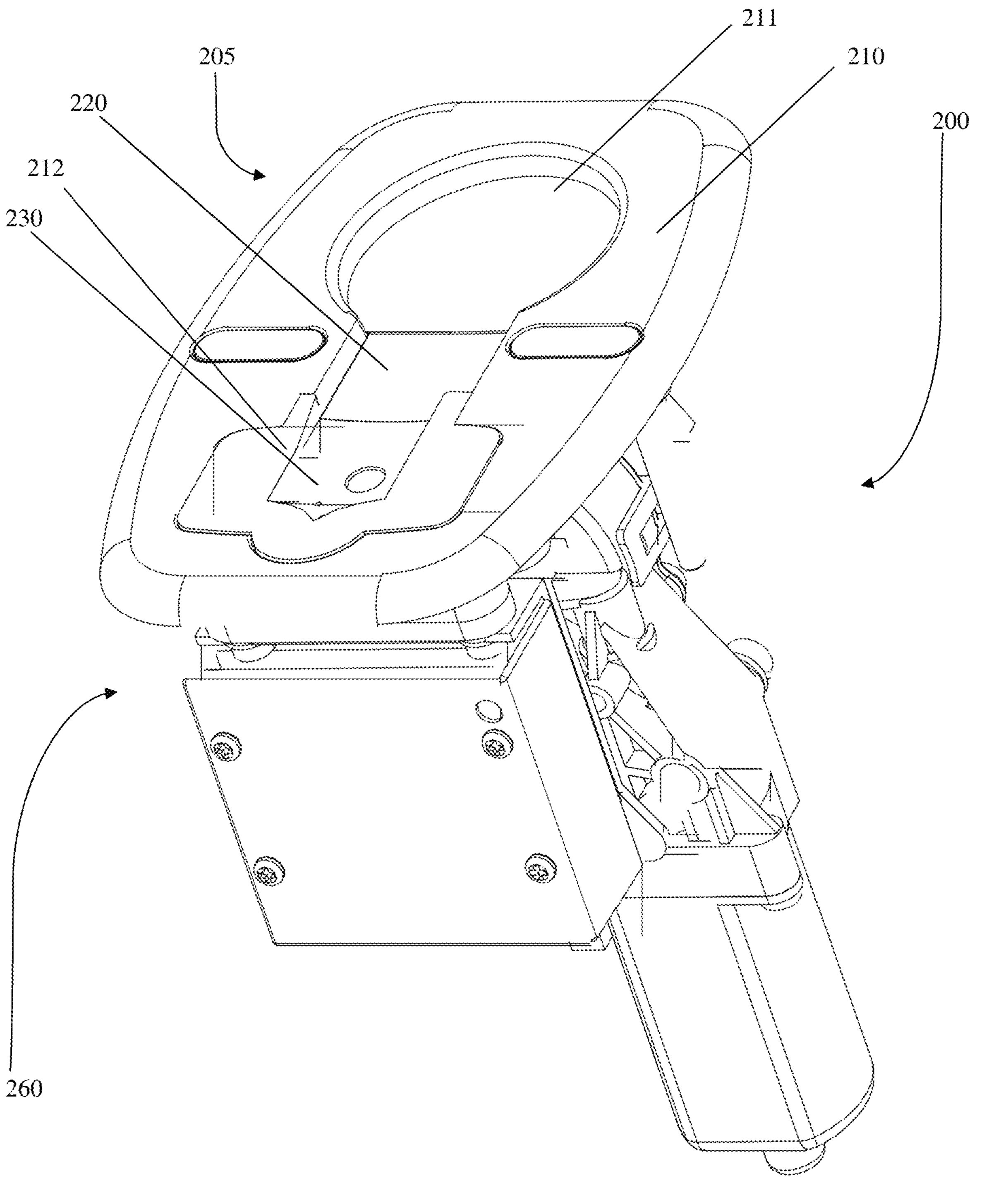
FIG. 8 is a perspective view of a security tag assembly detacher assembly.

With reference now to FIG. 8, FIG. 8 depicts a perspective view of a security tag assembly detacher assembly 200. As can be seen, the detacher assembly 200 can comprise a faceplate 205, an exterior surface of the faceplate 210, a faceplate aperture 211, a guide track 212, a faceplate nestled surface 220, a detacher tooling plate 230, and a guide track 212. Also, at an orientation that can be considered vertical height below or underneath the abovementioned elements may be a detacher mechanism 260 (which will be described in more detail). As such, given the above, it may be apparent that a portion of a security tag assembly 100 may be inserted into the faceplate aperture 211, and slid along the faceplate nestled surface 220 to a point over the detacher tooling plate 230. Then, the instant assembly 200 may have detacher tooling 240 (as will be described), applied thereto, to allow the assembly 100 to transition from a connected state to a disconnected state. Notably, the slot S of the first half 111 of the assembly 100 can be used in conjunction with the guide track 212 to allow for the proper alignment of the assembly 100 about the detacher assembly 200. With more specificity, the guide track 212 can allow for a security tag assembly 100 to be oriented about the detacher tooling plate 230 at a specific orientation such that the assembly's 100 geometric aperture patterns 1111/1411 may match with and be at an orientation above the geometric aperture pattern(s) 2111 of the detacher assembly 200 (as will be described) As such, the detacher assembly 200 and the process in which it may operate is described in subsequent detail.

With continued reference to FIG. 8, it can be noted that the faceplate aperture 211 can include a volume of space above the faceplate nestled surface 220 and the detacher tooling plate 230. As such, the faceplate aperture 211 can run from an exterior space, such as one vertically above the faceplate exterior surface 210, to a space below the faceplate 205, but can also run from an exterior space, such as one vertically above the faceplate exterior surface 210, to the faceplate nestled surface 220 and detacher tooling plate 230. As such, the faceplate nestled surface 220 and detacher tooling plate 230 can exist at a vertical dimensioning below the faceplate exterior surface 205. Further, the detacher tooling plate 230 can be in parallel with the faceplate nestled surface 220, such that the surface the nestled surface 220 and detacher tooling plate 230 forms is flat. That said, the detacher tooling plate 230 may have a concave surface geometry 231 that conforms to a bulbous shape a first half 111 of a security tag assembly 100 may have. In light of this geometry, only a portion of the security tag assembly 100, such as a portion of the first half 111 of the housing 110 of the assembly 100 may be inserted into the faceplate aperture 211. This geometry 231 is also one feature (of others) that allow for the assembly 100 to be inserted into a specific orientation within/on the detacher assembly 200.

Figure 9:
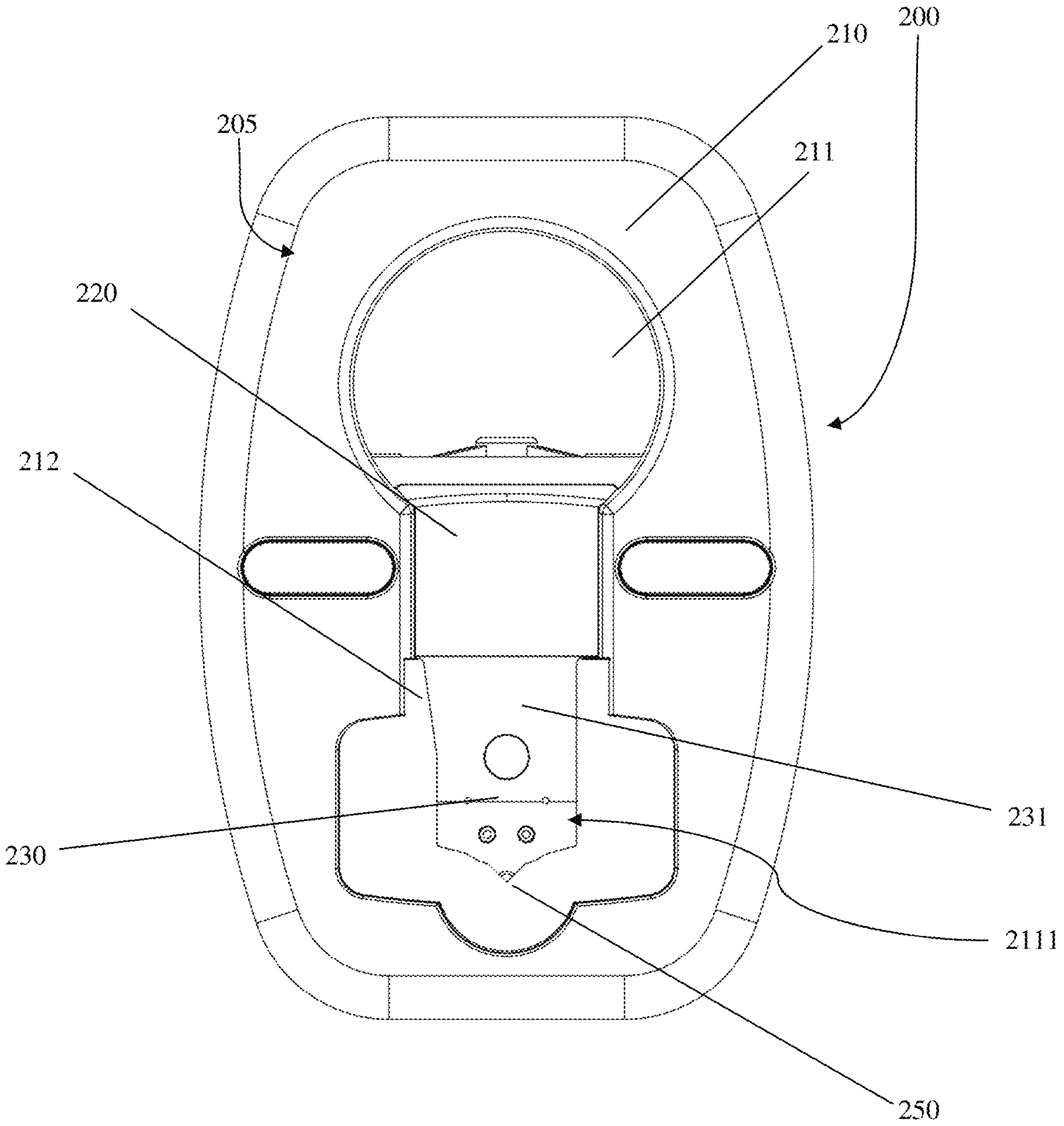
FIG. 9 is a top view of a security tag assembly detacher assembly.

With reference now to FIG. 9, a top view of the detacher assembly 200 can be seen. This view provides a clearer view of the detacher tooling plate 230, which can be seen as comprising a detacher assembly geometric aperture pattern 2111 (which will be described in more detail). That said, it should be noted that the detacher assembly geometric aperture pattern 2111 can match a portion of the aforementioned geometric aperture patterns 1111/1411. Indeed, the detacher assembly geometric aperture pattern 2111 may not directly match the aforementioned geometric aperture patterns 1111/1411, but, rather, may only match a portion thereof. By way of example only, where a geometric aperture pattern 1111/1411 may have a hexagonal shape, the detacher assembly geometric aperture pattern 2111 may be dimensioned to only match four of the six hexagonally shaped apertures of a geometric aperture pattern 1111/1411.

Also, a switch 250 can also be seen, existing at an extremity of the faceplate aperture 211. Notably, the switch 250 may rest at a vertical distance below the faceplate exterior surface 210, but above the detacher tooling plate 230.

Figure 10:
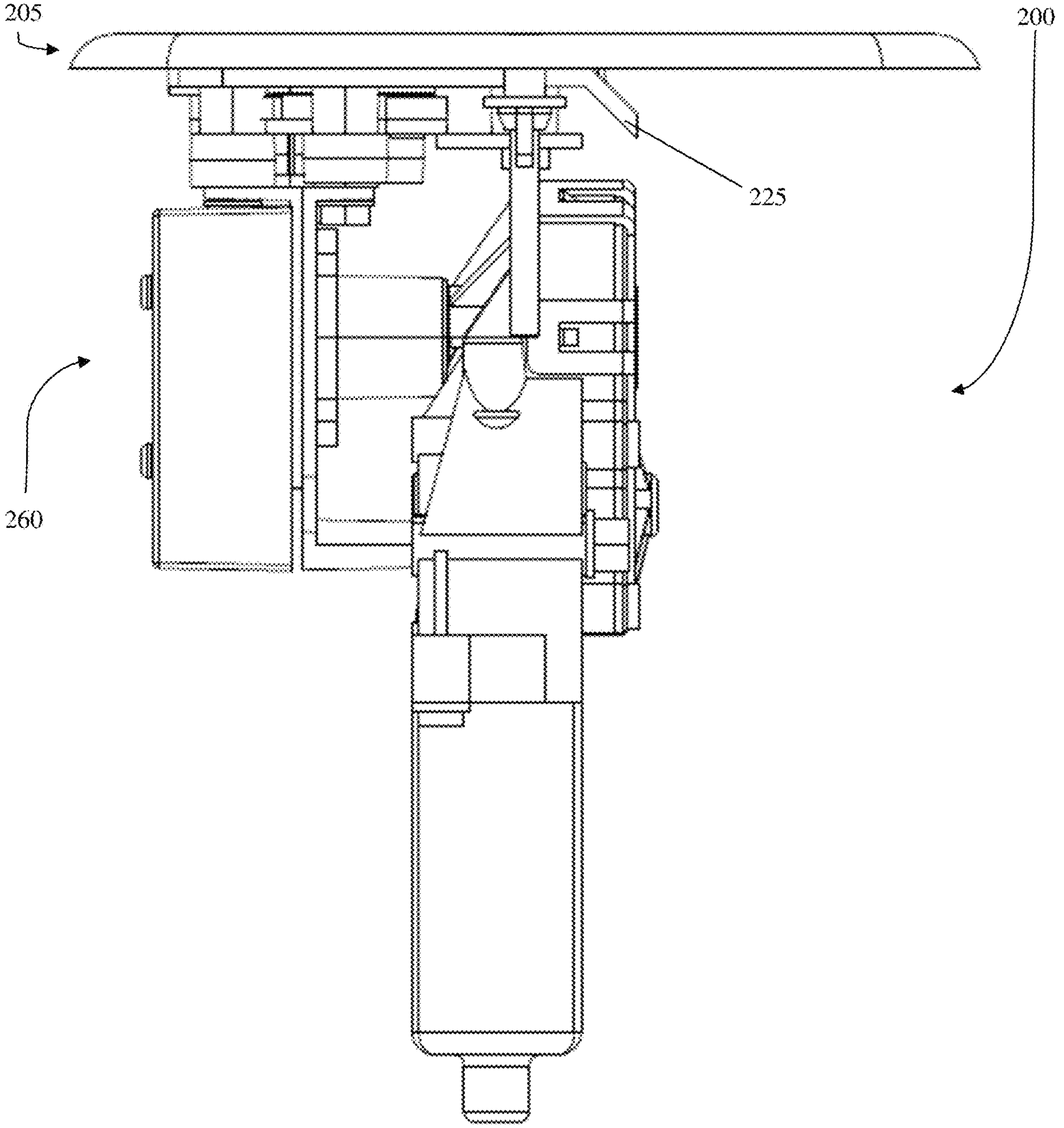
FIG. 10 is a side view of a security tag assembly detacher assembly.

Considering FIGS. 9 and 10, the detacher assembly 200 can be seen from distinct views. Given that the faceplate 205 (and exterior 210 thereof) can be substantially flat (as imaged in FIGS. 9 and 10), and each other portion of the assembly 200 generally exists at a vertical orientation below the faceplate 205, it should be noted that the assembly 200 can be encapsulated via different means via mounts. In other words, an external device (not depicted in the Figures) can be formed around the periphery of the faceplate 205 and connected to the assembly 200 via mounts of the assembly 200. As such, the external device may allow for the assembly 200 to be encapsulated by a handheld device, making the assembly 200 able to be used on security tag assemblies 100, much like label gun/price marker is used via handheld means. Alternatively, the assembly 200 can be mounted to a tabletop/surface, the faceplate 205 being embedded on the tabletop/surface and the remainder of the assembly 200 being encapsulated by a table or otherwise underneath the tabletop/surface. With reference to FIG. 10, it can be noted that tooling plate 230 or the faceplate nestled surface 220 may comprise a faceplate ramp 225. This ramp 225 may allow a security tag assembly 100 to first be inserted into the faceplate aperture 211, then traverse to a vertical height that will allow the slot S of the first half 111 of the assembly 100 to align with/be caught by the guide track 212. This ramp 225 is also one feature (of others) that allow for the assembly 100 to be inserted into a specific orientation within/on the detacher assembly 200.

Figure 11:
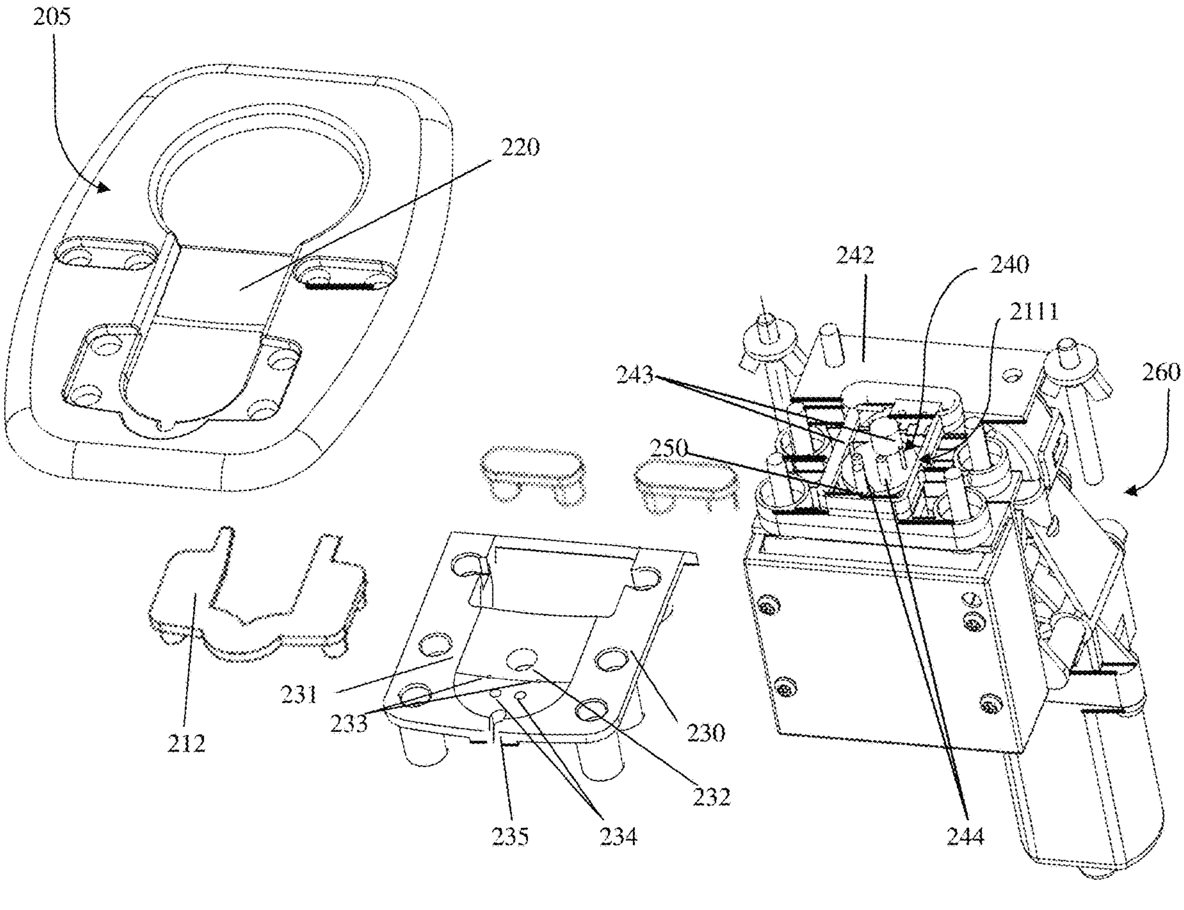
FIG. 11 is a partially exploded perspective view of a security tag assembly detacher assembly.

With reference now to FIG. 11, various portions of the assembly 200 can be seen. More specifically, the faceplate 205 can be seen, wherein it can be noted that the faceplate nestled surface 220 is a portion of the faceplate 205, albeit resting at a position lower than the faceplate exterior surface 210. In addition, the guide track 212 can be seen. Notably, the guide track 212 may have specific sidewall geometries (such as a dimensioning of one of the sidewalls but not the other, that allow a security tag assembly 100, when passed through the guide track 212, to rotate and rest at a specific orientation within the guide track 212 such that the detacher assembly geometric aperture pattern 2111 can match a portion of the aforementioned geometric aperture patterns 1111/1411 when a security tag assembly 100 comes to rest a within/on a detacher assembly 200. Notably, the guide track 212 can guide a tag assembly 100 from one extremity (closer to the nestled surface 220, as depicted), to another extremity of the guide track 212 (further from the nestled surface 220, as depicted).

In addition, the tooling plate 230 can be seen. As previously mentioned, the tooling plate 230 may have a concave geometry 231 to allow a tag assembly 100 to slide along a length of the surface of the plate 230 in a specific way to achieve a specific orientation within/on a detacher assembly 200. Further, the tooling plate may comprise a switch cutout 235 for a switch 250 (as previously mentioned). Notably, as a switch 250 is depressed/has a force acted upon it (for example, by a tag assembly 100), the switch 250 may activate a detacher mechanism 260 (as will be described). Further, the tooling plate 230 can comprise a placeholder aperture 232 (for a placeholder 242 to penetrate therethrough), at least one removal pin dispensing aperture 233 (for at least one removal pin 243 to penetrate therethrough), and at least one placeholder pin dispensing aperture 234 (for at least one placeholder pin 244 to penetrate therethrough). As may be noted, the at least one removal pin dispensing aperture 233 and the at least one placeholder pin dispensing aperture 234 may form the detacher assembly geometric aperture pattern 2111.

Figure 13:
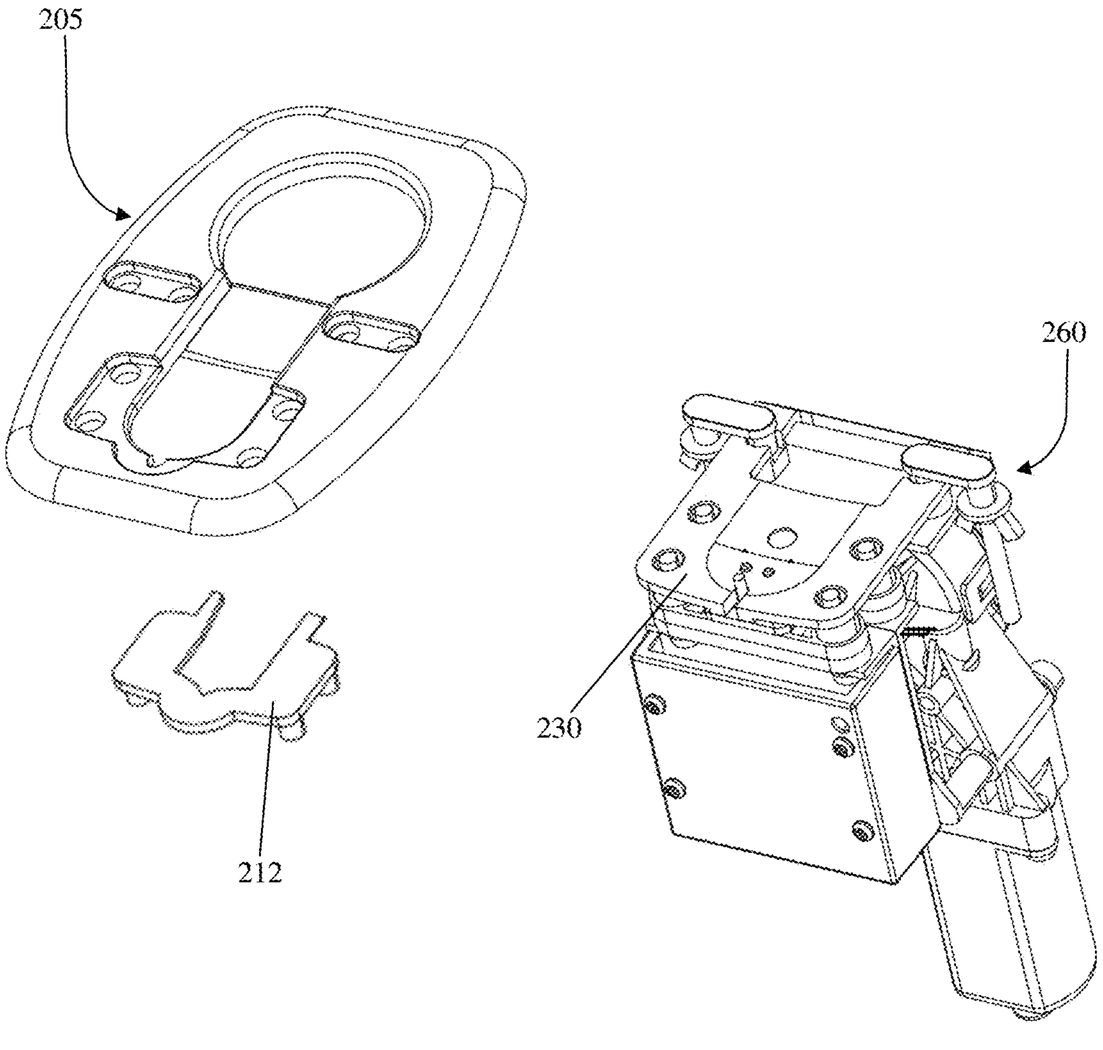
FIG. 13 is an alternative view of a partially exploded perspective view of a security tag assembly detacher assembly.
Figure 14:
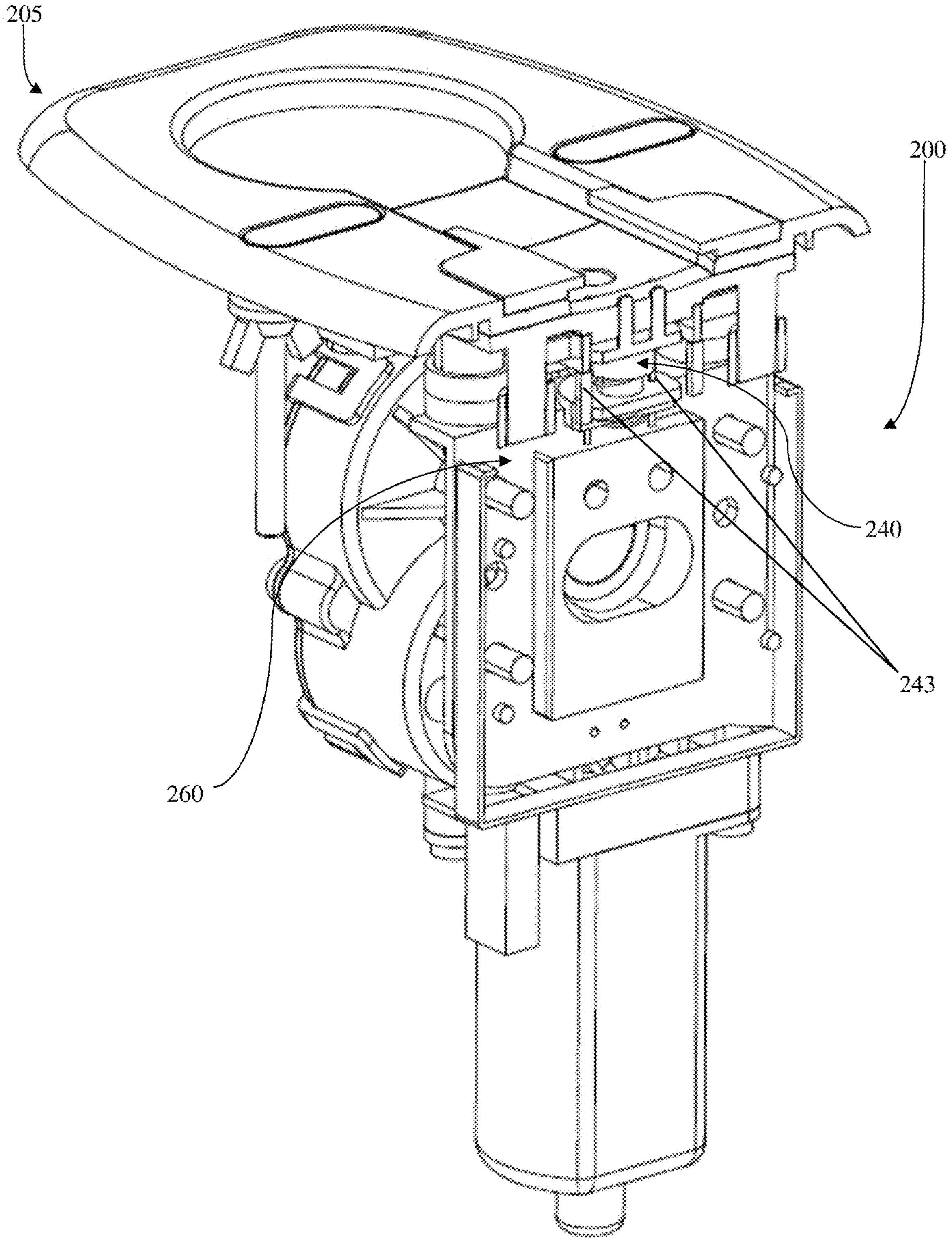
FIG. 14 is a perspective cut away view of a security tag assembly detacher assembly where the detacher mechanism is not activated.
Figure 15:
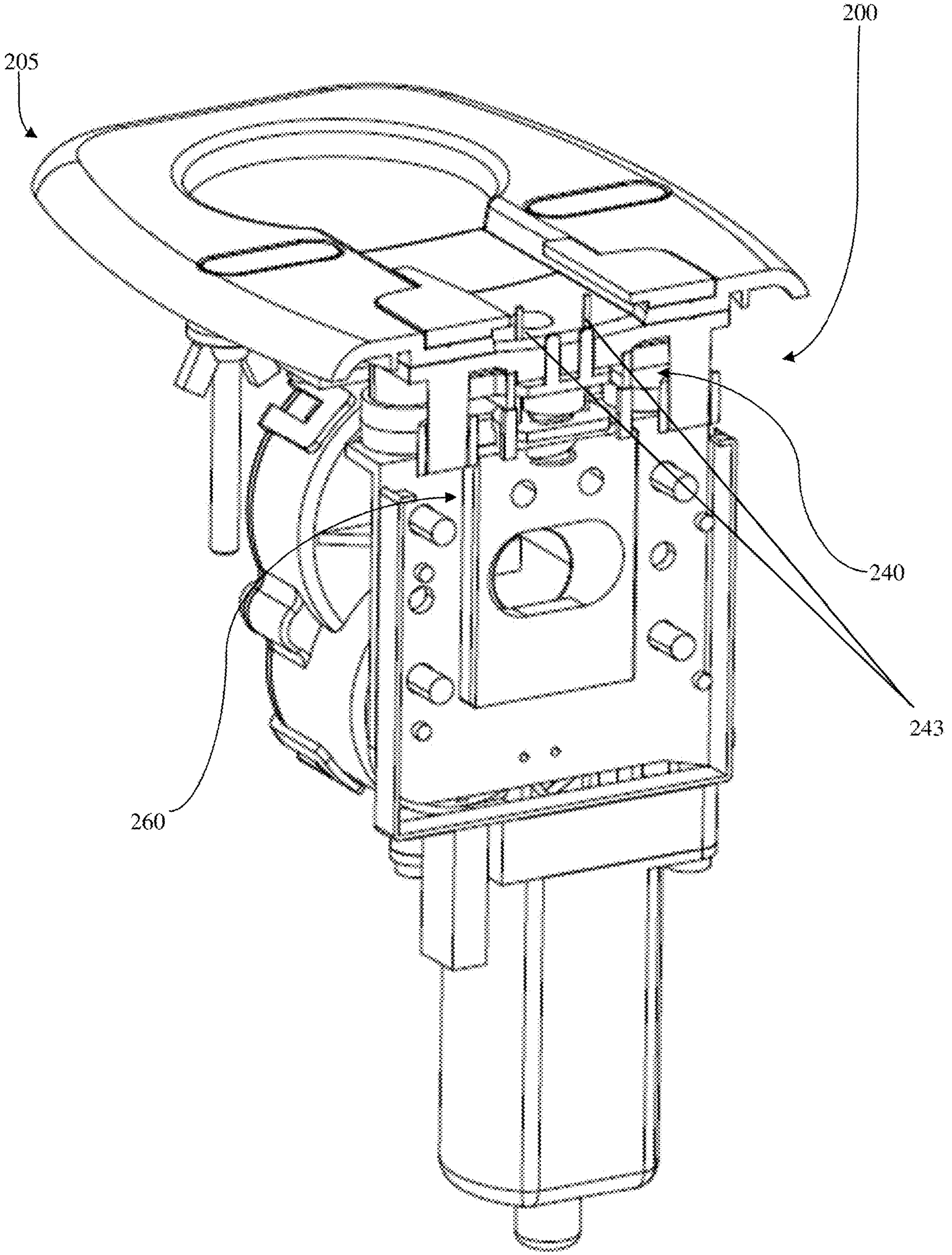
FIG. 15 is a perspective cut away view of a security tag assembly detacher assembly where the detacher mechanism has been activated.
Figure 16:
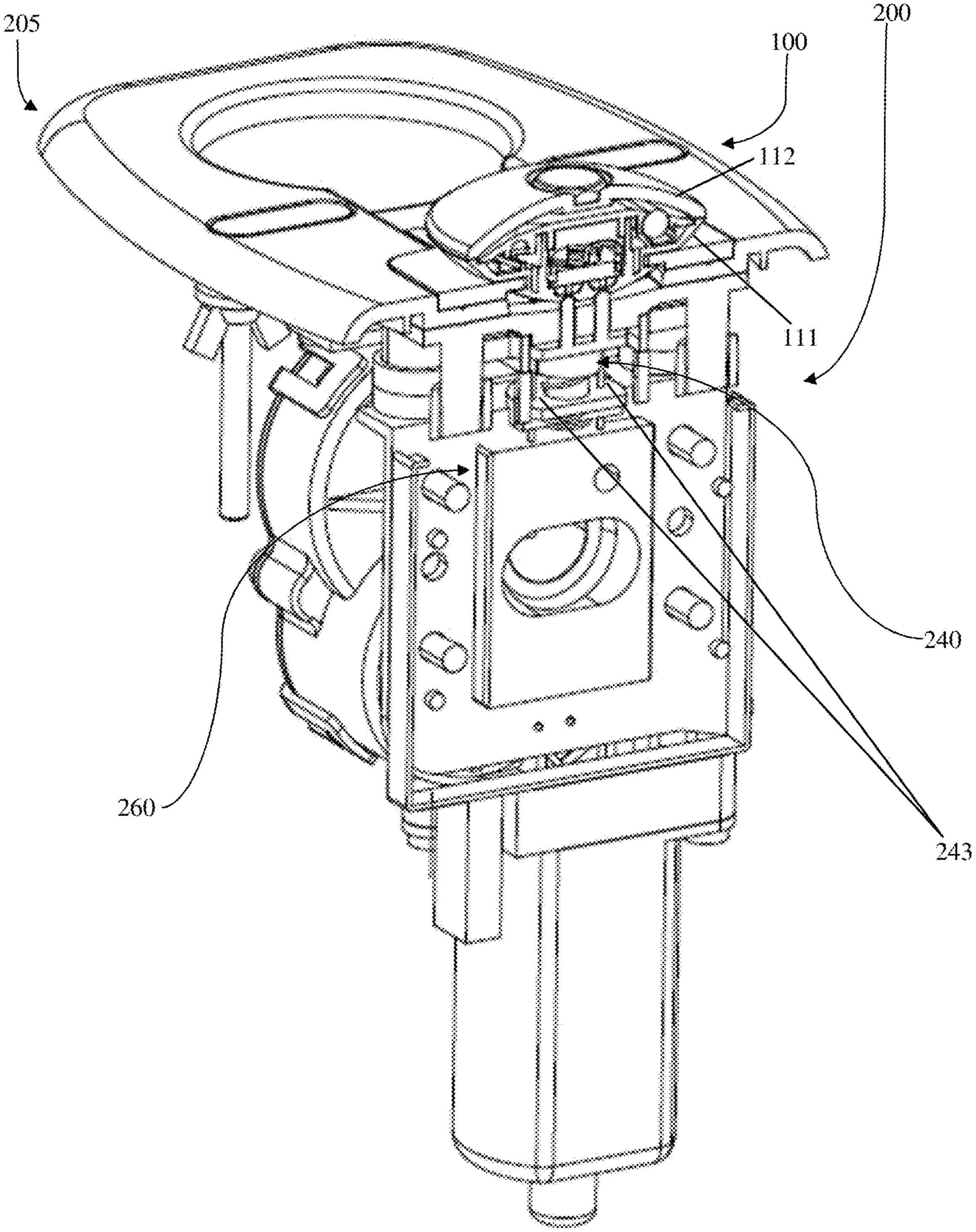
FIG. 16 is a perspective cut away view of a security tag assembly detacher assembly with a security tag assembly placed at a specific orientation about the security tag assembly detacher where the detacher mechanism is not activated.
Figure 17:
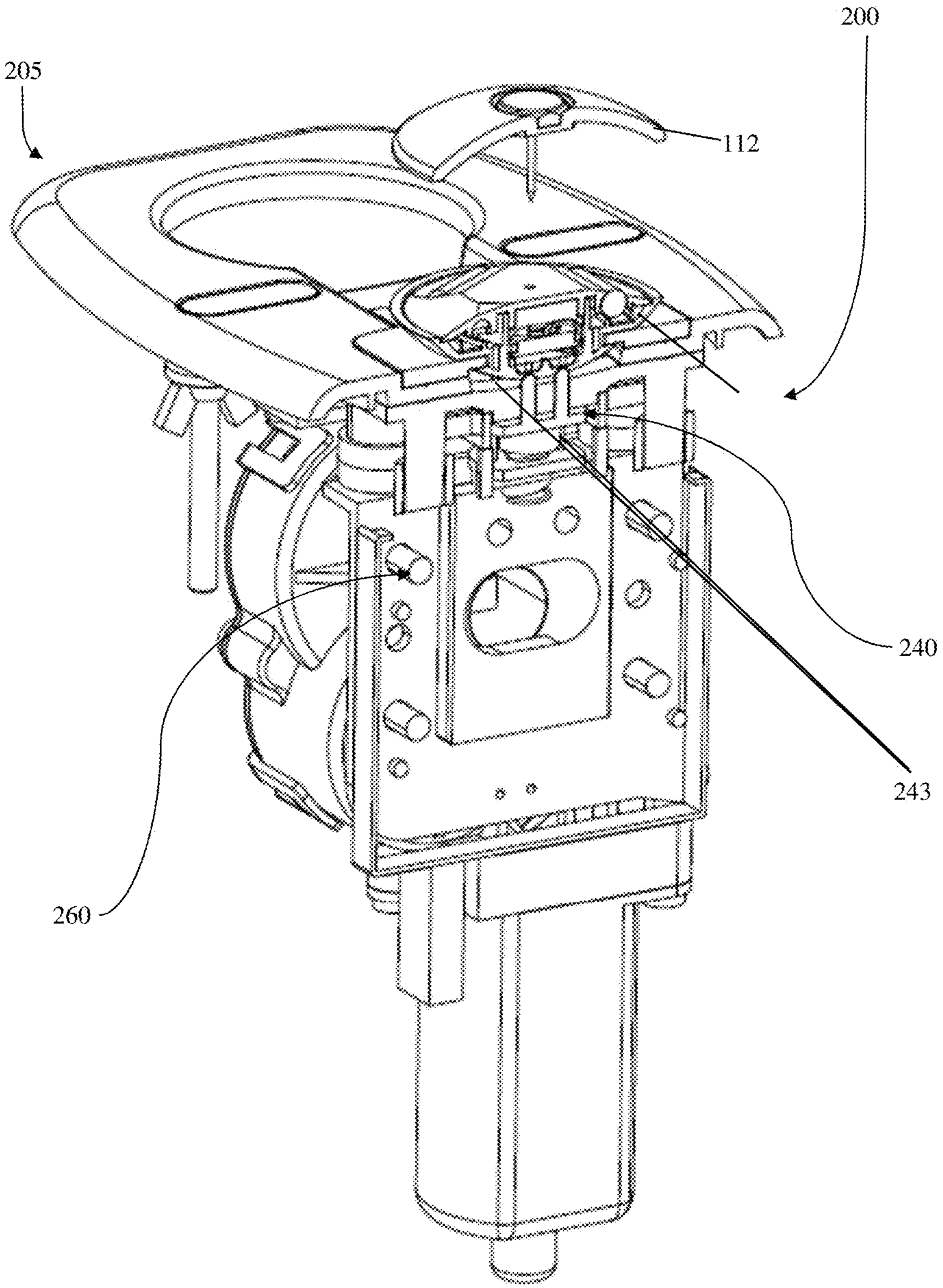
FIG. 17 is a perspective cut away view of a security tag assembly detacher assembly with a security tag assembly placed at a specific orientation about the security tag assembly detacher where the detacher mechanism has been activated.

With brief reference to FIG. 13, and as may be apparent, the detacher tooling plate 230 may rest atop the detacher mechanism 260 (and elements thereof that will be described below), where the faceplate 205 rests atop the detacher tooling plate 230 (the faceplate nestled surface 220 being parallel to the detacher tooling plate 230), and where the guide track 212 may in line with/parallel to the faceplate 205, or may rest atop the faceplate 205.

Figure 12:
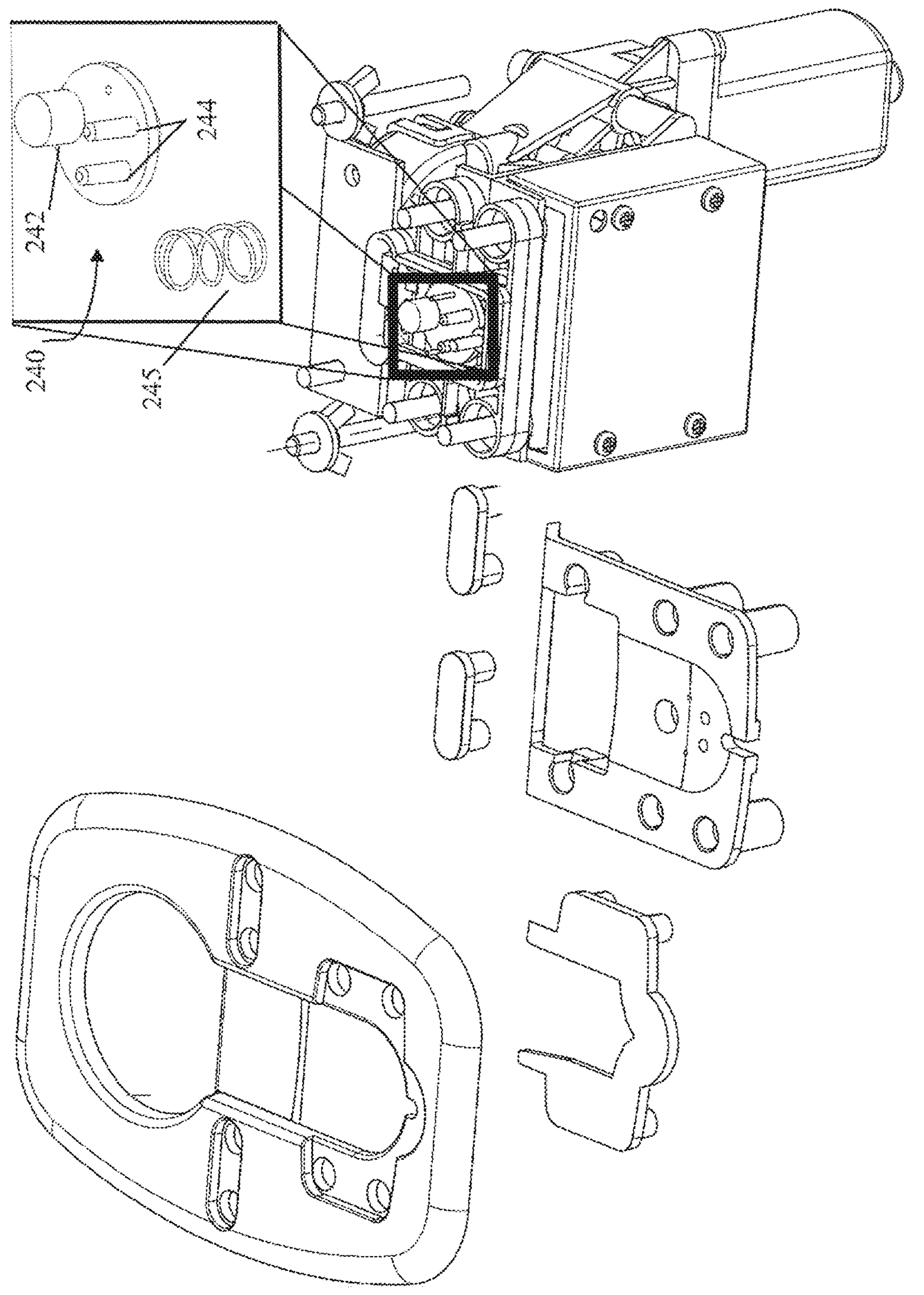
FIG. 12 is a partially exploded perspective view of a security tag assembly detacher assembly featuring and zooming in on a portion of detacher tooling therefore.

As such, with continued reference to FIG. 11, atop the detacher mechanism 260 may be a switch 250, which may rest within the switch cut out 235. Further, detacher tooling 240 may be seen, which can be comprised of at least one placeholder 240, at least one removal pin 243, and at least one placeholder pin 244. The at least one removal pin 243 and at least one place holder pin 244 may make up the detacher assembly geometric aperture pattern 2111. With brief reference to FIG. 12, it can be noted that a portion of the detacher tooling 240 may be made up of a unibody tab comprising the placeholder 242 and at least one placeholder pin(s) 244. The unibody tab may comprise apertures to allow at least one removal pin 243 to penetrate therethrough, and may rest on a detacher tooling spring 245 (which is centered about a shaft the unibody tab may also rest and actuate upon). As such, the unibody tab can be compressed upon the spring 245. The spring 245 may be connected to a shut off switch, the shut off switch being able to detect if forces are on the spring 245. If forces are indeed on the spring 245, the shut off switch may allow the detacher mechanism 260 to activate (provided the switch 250 is depressed).

Beneath the unibody tab may be at least one removal pin 243, which may rest atop a plate. The plate (or at least one removal pin 243 alone) may be operatively connected to a motorized element (the plate and/or motorized element being components of the detacher mechanism 260). Once the switch 250 is depressed, the switch 250 can activate the detacher mechanism 260, causing the motorized element to activate. In turn, the motorized element causes the plate (or removal pin(s) 243 alone) to actuate. In turn, the removal pin(s) 243 vertically move, perhaps passing through the unibody tab, but passing through the detacher tooling plate 230.

Notably, the detacher mechanism 260 may comprise a counter (to determine each time the switch 250 is depressed), the counter being able to indicate how many security tag assemblies 100 were removed using the detacher assembly 200. The detacher mechanism 260 may also comprise an RFID or infrared sensing device, able to determine quantifiable characters (such as a unique identifier number) pertaining to a non-visible wavelength emitter of a security tag assembly 100. Notably, the RFID or infrared sensing device may be powered "on" or may be unpowered, or "off." As such, the RFID or infrared sensing device may be powered "on" by nature of the assembly 200 being connected to a retailer environment sales system through electronic means. Therefore, by way of non-limiting example, when a retailer environment's clerk is signed in or otherwise accessing a retailer environment sales system, the RFID or infrared sensing device may be powered "on" whereas at times when a retailer environment's clerk is not signed in or otherwise not accessing a retailer environment sales system, the RFID or infrared sensing device may be powered "off." Alternatively, and by way of non-limiting example, an RFID or infrared sensing device may be powered "on" for a brief period of time (such as for 1 seconds), after the switch 250 is depressed, then transitioning back to an "off" state. As may be apparent, the RFID or infrared sensing device may go from being powered on to off so as to ensure that the device does not detect signals from an assembly 100 with at least one non-visible wavelength emitter 122 that is not being used on the detacher assembly 200. To accomplish powering the RFID or infrared sensing device, a bridge, that may function like a switch, may be incorporated into the detacher assembly's 200 electronics.

Now that the forgoing has been described, below exemplifies how a security tag assembly 100 may be used in conjunction with a detacher assembly 200. As such, at a department store, a valuable item has a security tag assembly 100 attached thereto, the assembly 100 being in the connected state. When checking out, the item is provided to a check-out assistant, who then goes to remove the security tag assembly 100 from the item via the use of a detacher assembly 200. As such, the first half 111 of the security tag assembly 100 is inserted into the detacher's 200 faceplate aperture 211. Without having to exert much effort or carefully think about what the check-out assistant is doing, the check-out assistant can then move the security tag assembly 100 in a direction towards the switch 250 of the detacher 200. In doing so, the faceplate ramp 225 allows the first half 111 of the assembly 100 to move to a vertical height such that the first half 111 is in contact with the faceplate nestled surface 220 where the surface 220 is in parallel relation to the detacher tooling plate, and where the first half's 111 slot S captures and aligns with the guide track 212. The slot S allows for the assembly 100 to be retained on/within the detacher assembly 200 such that vertical forces applied to the assembly 100 would not allow the assembly to be removed from the detacher assembly 200.

As such, as the assembly 100 continues to move towards the switch 250, the guide track 212 ensures the precise alignment and orientation of the assembly 100 such that the assembly's 100 aperture patterns 1111/1411 may be placed directly over and in matching relation to the detacher assembly geometric aperture pattern 2111. Further, as the assembly 100 is slid along the length of the faceplate nestled surface 220, it eventually reaches the detacher tooling plate 230, which the concave surface geometry 231 thereof also allows the assembly 100 to move into a precise alignment such that the assembly's 100 aperture patterns 1111/1411 may be placed directly over and in matching relation to the detacher assembly geometric aperture pattern 2111.

As such, as the assembly 100 is slid over the detacher tooling 240, the unibody tab (with the at least one placeholder 242 and at least one placeholder pin 244 thereon) may depress. At that point, if the assembly 100 is specifically oriented within/on the detacher assembly 200, the placeholder 242 may be exerting an upward force (through the use of the spring 245) upon the tag assembly 100 where the placeholder pins 244 may be inserted into at least one aperture of the security tag assembly 100 that forms the geometric aperture pattern 1111/1411 for the purpose of holding the assembly 100 at a specific orientation. In such an instance, the shut off switch (as previously mentioned), may not cause a shut off. Alternatively, if the assembly 100 is not specifically oriented within/on the detacher assembly 200, the placeholder 242 may be exerting an upward force (through the use of the spring 245) upon the tag assembly 100, but the placeholder pins 244, would not be inserted into the at least one aperture of the security tag assembly 100 that forms the geometric aperture pattern 1111/14111. As a result, the spring 245 would be depressed and would activate the shut off switch, not allowing the detacher mechanism 260 to activate, regardless as to if the switch 250 is depressed. As such, in either instance above, the tag assembly 100 would be oriented within/on the detacher assembly 200 such that the switch 250 is depressed. Assuming that the tag assembly 100 is in the specific orientation described above (where the at least one placeholder pin 244 is inserted into at least one aperture of the security tag assembly 100 that forms the geometric aperture pattern 1111/1411), then the detacher mechanism 260 can activate. As such, the removal pin(s) 243 may be inserted into at least one aperture of the security tag assembly 100 that forms the geometric aperture pattern 1111/1411, passing through the retaining insert 140 and contacting the pressure plate ring 130. The removal pin(s) 243 may apply an equal pulling force unto the pressure plate ring 130 to cause the ring 130 to transition from a pressure applying state to a non-pressure applying state, allowing the assembly 100 to transition from a connected state to a disconnected state. Even where the ring 130 is not in a pressure applying state, the removal pin(s) 243 may apply a pulling force to allow the pin 128 to drop, going from a locked state to an unlocked state, causing the assembly 100 to transition from a connected state to a disconnected state. As this occurs, the detacher mechanism 260 may count each successful disconnection of the assembly 100, or track metrics using the RFID or infrared sensing device for each successful disconnection of the assembly 100.

As such, the assembly 100 would disconnect from the item, allowing the check-out assistant to provide a customer with the item without an assembly 100 thereon. Notably, if the detacher mechanism 260 does not activate because of the shut off switch and improper orientation, the check-out assistant could simply remove the assembly 100 from the detacher assembly 200 and re-insert it to allow for the assembly 100 to become properly oriented at a specific orientation within/on the detacher 200, in a matter of seconds. As a result, removal of the assembly 100 from an item, in conjunction with the use of the detacher assembly 200 is a quick and relatively thoughtless procedure.

As such, the unibody tab can be compressed upon the spring 245. The spring 245 may be connected to a shut off switch, the shut off switch being able to detect if forces are on the spring 245. If forces are indeed on the spring 245, the shut off switch may allow the detacher mechanism 260 to activate (provided the switch 250 is depressed).

Since many modifications, variations and changes in detail can be made to a security tag assembly, it is intended that all matters in the foregoing description and shown in the accompanying drawings be interpreted as illustrative and not in a limiting sense.

What is claimed is:

1. A detacher assembly for a security tag assembly comprising:

detacher tooling, comprising at least one removal pin, at least one placeholder pin, and at least one placeholder, wherein said detacher tooling forms a detacher assembly geometric aperture pattern; and a switch, configured to activate a detacher mechanism when depressed by a security tag assembly;

wherein said at least one placeholder pin and said at least one placeholder are mounted on a spring-loaded surface.

2. The detacher assembly for a security tag assembly of claim 1 wherein said at least one removal pin is configured and dimensioned to pass through at least one removal pin dispensing aperture, said at least one placeholder pin passes through at least one placeholder pin dispensing aperture, and said at least one placeholder passes through at least one placeholder aperture.

3. The detacher assembly for a security tag assembly of claim 2 wherein said at least one removal pin dispensing aperture, said at least one placeholder pin dispensing aperture, and said at least one placeholder aperture form said detacher assembly geometric aperture pattern.

4. The detacher assembly for a security tag assembly of claim 3 where said detacher mechanism is configured and dimensioned to raise said at least one removal pin from an orientation below said removal pin dispensing aperture to an orientation above said removal pin dispensing aperture and into a security tag assembly, causing the security tag assembly to break away.

5. The detacher assembly for a security tag assembly of claim 4 wherein said detacher mechanism comprises a plate operatively connected to said at least one removal pin and a motorized element, wherein said motorized element is operatively connected to said plate and configured and dimensioned to move said plate in a vertical direction.

* * * * *